(12) United States Patent
Irisawa

(10) Patent No.: US 7,420,197 B2
(45) Date of Patent: Sep. 2, 2008

(54) RADIATION IMAGE DETECTION METHOD AND SYSTEM

(75) Inventor: Kaku Irisawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 248 days.

(21) Appl. No.: 11/486,042

(22) Filed: Jul. 14, 2006

(65) Prior Publication Data

US 2007/0012890 A1    Jan. 18, 2007

(30) Foreign Application Priority Data

Jul. 14, 2005    (JP) .............................. 2005-205177

(51) Int. Cl.
*G01T 1/16*    (2006.01)
(52) U.S. Cl. ...................... 250/580; 250/584; 250/591; 378/37
(58) Field of Classification Search .................. None
See application file for complete search history.

(56) References Cited

U.S. PATENT DOCUMENTS

| 4,535,468 | A | * | 8/1985 | Kempter | ...................... 378/31 |
| 6,268,614 | B1 | | 7/2001 | Imai | |
| 6,770,901 | B1 | | 8/2004 | Ogawa et al. | |
| 2004/0104362 | A1 | * | 6/2004 | Imai | ........................... 250/582 |

OTHER PUBLICATIONS

Ralph H. Page et al., "Upconversion-Pumped Luminescence Efficiency of Rare-Earth-Doped Hosts Sensitized with Trivalent Ytterbium", J.Opt. Soc. Am. B, Mar. 1998, pp. 996-1008, vol. 15, No. 3.

H. de Monts and F. Beaumont, "A New Photoconductor Imaging System for Digital Radiography", Medical Physics, 1989, pp. 105-109, vol. 16, No. 1.

* cited by examiner

*Primary Examiner*—David P. Porta
*Assistant Examiner*—Yara B Green
(74) *Attorney, Agent, or Firm*—Sughrue Mion, PLLC

(57) ABSTRACT

A radiation image detector includes an up-conversion phosphor layer for emitting fluorescence by irradiation with infrared light, a first electrode layer for transmitting the infrared light, the fluorescence and radiation carrying a radiation image, a photoconductive layer for recording, a charge storage portion, a photoconductive layer for readout, and a second electrode layer for transmitting the infrared light and the readout light. Radiation is recorded as latent image charge in the charge storage portion. The electric charge is read out from the charge storage portion by irradiating the photoconductive layer for readout with the readout light from the second electrode layer side. The up-conversion phosphor layer is irradiated with the infrared light from the second electrode layer side and remaining charge in the vicinity of the first electrode layer is erased by fluorescence emitted from the up-conversion phosphor layer by irradiation with the infrared light.

10 Claims, 4 Drawing Sheets

RADIATION IMAGE DETECTION METHOD AND SYSTEM

BACKGROUND OF THE INVENTION

1. Field of the Invention

The present invention relates to a radiation image detection method and a radiation image detection system for reading out a radiation image recorded in a radiation image detector by irradiating the radiation image detector with readout light. The radiation image recorded in the radiation image detector is an image recorded by storing electric charge, based on the dose of radiation, generated by irradiation with radiation carrying a radiation image.

2. Description of the Related Art

Conventionally, a radiation image detection system which records radiation images using a radiation image detector, and which reads out the radiation images recorded in the radiation image detector as electric signals has been widely utilized in medical radiography or the like. Further, various kinds of such radiation image detection system have been proposed. In the radiation image detector, a radiation image of a subject is detected by storing electric charge corresponding to the dose of radiation, such as X-rays, transmitted through the subject in a charge storage portion.

As an example of the radiation image detector which is used in the radiation image detection system, as described above, a radiation image detector is disclosed in U.S. Pat. No. 6,268,614. In the radiation image detector disclosed in U.S. Pat. No. 6,268,614, a first electrode layer, a photoconductive layer for recording, a charge transport layer (an electric charge transport layer), a photoconductive layer for readout and a second electrode layer are superposed one on another in this order. The first electrode layer is a layer which transmits radiation. The photoconductive layer for recording is a layer which generates electric charge by irradiation with radiation. The charge transport layer is a layer which acts as an insulator against latent image charge, and which acts as a conductor of transport electric charge, of which the polarity is opposite to that of the latent image charge. The photoconductive layer for readout is a layer which generates electric charge by irradiation with readout light. The second electrode layer is a layer, in which linear electrodes are arranged in parallel. In the radiation image detection system using the radiation image detector, as described above, the radiation image detector is irradiated with radiation from the first electrode layer side of the radiation image detector while voltage is applied to the first electrode layer and the second electrode layer. Then, electric charge corresponding to the dose of the radiation, with which the radiation image detector is irradiated, is generated in the photoconductive layer for recording. In the electric charge generated in the photoconductive layer for recording, an electric charge of one of the polarities is combined with an electric charge charged in the first electrode layer. At the same time, in the electric charge generated in the photoconductive layer for recording, an electric charge of the other polarity is stored, as latent image charge, in a charge storage portion formed at the interface between the photoconductive layer for recording and the charge transport layer. Accordingly, a radiation image is recorded. Then, the radiation image detector is irradiated with readout light from the second electrode layer side. The readout light is transmitted through the second electrode layer, and the photoconductive layer for readout is irradiated with the readout light. When the photoconductive layer for readout is irradiated with the readout light, electric charge is generated in the photoconductive layer for readout. In the electric charge generated in the photoconductive layer for readout, an electric charge of one of the polarities is combined with the latent image charge stored in the charge storage portion. At the same time, an electric charge of the other polarity is detected by an electric current detection amplifier connected to the linear electrode. Accordingly, the radiation image is detected as electric signals.

In U.S. Pat. No. 6,268,614, a-Se is used as a material for the photoconductive layer for recording. Further, a radiation image detector, in which a crystallization prevention layer is provided between the photoconductive layer for recording and the first electrode layer, has been proposed to prevent crystallization of a-Se (U.S. Pat. No. 6,770,901).

However, in recent years, it was found out that there are some cases in which electric charge remains in a portion of the photoconductive layer for recording which is in the vicinity of the first electrode layer after a radiation image is read out from a radiation image detector.

For example, in the radiation image detector disclosed in U.S. Pat. No. 6,268,614, when a radiation image is recorded, the movement of an electric charge, of which the polarity is opposite to that of the latent image charge, in the electric charge generated in the photoconductive layer for recording is prevented at the interface between the photoconductive layer for recording and the first electrode layer. Therefore, the electric charge remains at a portion of the photoconductive layer for recording which is in the vicinity of the first electrode layer in some cases. For example, if the latent image charge is a negative electric charge, the electric charge, of which the polarity is opposite to that of the latent image charge, is a positive electric charge. Particularly, when a crystallization prevention film is provided between the photoconductive layer for recording and the first electrode layer, there is a tendency that the movement of more electric charge is prevented and more electric charge remains. Such electric charge which remains in the vicinity of the first electrode layer is not substantially read out or erased in ordinary readout operations. Therefore, when a next radiation image is recorded, there is a risk that the image quality of the radiation image deteriorates because the next radiation image is recorded without erasing the electric charge remaining in the vicinity of the first electrode.

It is well known that generally, irradiation with erasing light, particularly, irradiation with erasing light, of which the wavelength is within the bandwidth of wavelengths of blue light, or irradiation with erasing light, of which the wavelength is within the bandwidth of wavelengths of green light, is effective to erase the remaining electric charge. In U.S. Pat. No. 6,268,614, the radiation image detector is irradiated with erasing light, of which the wavelength is within the bandwidth of wavelengths of blue light, or with erasing light, of which the wavelength is within the bandwidth of wavelengths of green light, from the second electrode layer side to erase the remaining electric charge in the vicinity of the charge storage portion. However, the light with a wavelength within such bandwidths is absorbed in the photoconductive layer. Therefore, when the radiation image detector is irradiated with such erasing light from the second electrode layer side, the erasing light does not reach the vicinity of the first electrode layer. Hence, the remaining electric charge in the vicinity of the first electrode layer is not substantially erased by performing conventional erasing operations, in which the radiation image detector is irradiated with the erasing light from the second electrode layer side.

Meanwhile, if the radiation image detector is irradiated with erasing light from the first electrode side, the remaining electric charge is excited and the movement of the electric charge is accelerated. Hence, the remaining electric charge can be erased. However, there is a problem that if a light source unit for erasing light is provided on the first electric side, the thickness of the radiation image detector becomes thick.

SUMMARY OF THE INVENTION

In view of the foregoing circumstances, it is an object of the present invention to provide a radiation image detection method and a radiation image detection system which are compact, and which can improve the image quality of a radiation image which is read out, by erasing remaining electric charge trapped in the vicinity of a first electrode layer.

A radiation image detection method according to the present invention is a radiation image detection method using a radiation image detector, wherein the radiation image detector includes an up-conversion phosphor layer, a first electrode layer, a photoconductive layer for recording, a charge storage portion, a photoconductive layer for readout and a second electrode layer, and wherein the up-conversion phosphor layer emits fluorescence with a wavelength shorter than that of infrared light by irradiation with the infrared light, and wherein the first electrode layer transmits the infrared light, the fluorescence and radiation carrying a radiation image, and wherein the photoconductive layer for recording is a layer which transmits the infrared light, and which exhibits conductivity and generates electric charge corresponding to the dose of radiation by irradiation with the radiation transmitted through the first electrode layer, and wherein the charge storage portion stores electric charge generated in the photoconductive layer for recording, and wherein the photoconductive layer for readout is a layer which transmits the infrared light, and which exhibits conductivity by irradiation with readout light, and wherein the second electrode layer transmits the infrared light and the readout light, and wherein the radiation image detector records radiation as latent image charge in the charge storage portion, the method comprising the steps of:

reading out the electric charge stored in the charge storage portion by irradiating the photoconductive layer for readout with the readout light from the second electrode layer side of the radiation image detector;

irradiating the up-conversion phosphor layer with the infrared light from the second electrode layer side; and erasing remaining charge which is present in the vicinity of the first electrode layer by fluorescence emitted from the up-conversion phosphor layer by irradiation with the infrared light.

The wavelength of the fluorescence may be within a range of 400 nm to 800 nm.

A radiation image detection system according to the present invention is a radiation image detection system comprising:

a radiation image detector;

a readout light irradiation means; and an infrared light irradiation means, wherein the radiation image detector includes an up-conversion phosphor layer, a first electrode layer, a photoconductive layer for recording, a charge storage portion, a photoconductive layer for readout and a second electrode layer, and wherein the up-conversion phosphor layer emits fluorescence with a wavelength shorter than that of infrared light by the irradiation with infrared light, and wherein the first electrode layer transmits the infrared light, the fluorescence and radiation carrying a radiation image, and wherein the photoconductive layer for recording is a layer which transmits the infrared light, and which exhibits conductivity and generates electric charge corresponding to the dose of radiation by irradiation with the radiation transmitted through the first electrode layer, and wherein the charge storage portion stores electric charge generated in the photoconductive layer for recording, and wherein the photoconductive layer for readout is a layer which transmits the infrared light, and which exhibits conductivity by irradiation with readout light, and wherein the second electrode layer transmits the infrared light and the readout light, and wherein the radiation image detector records radiation as latent image charge in the charge storage portion, and wherein the readout light irradiation means irradiates the photoconductive layer for readout with the readout light from the second electrode layer side, and wherein the infrared light irradiation means irradiates the up-conversion phosphor layer with the infrared light from the second electrode side, and wherein remaining charge which is present in the vicinity of the first electrode layer is erased by fluorescence emitted from the up-conversion phosphor layer by irradiation with the infrared light.

The wavelength of the fluorescence may be within a range of 400 nm to 800 nm.

Further, one of $YF_3$:Yb+Er, $YF_3$:Yb+Tm and BaFCL:Yb+Er may be used as an activator in the up-conversion phosphor layer.

Further, the up-conversion phosphor layer may be a layer in which phosphor particles with diameters less than or equal to 150 μm are evenly dispersed.

Further, the photoconductive layer for recording and the photoconductive layer for readout, provided in the radiation image detector, may be separate photoconductive layers. Alternatively, a single photoconductive layer, may, function both as the photoconductive layer for recording and as the photoconductive layer for readout. Further, the photoconductive layer for readout may be a charge-transporting photoconductive layer for readout, which has an electric charge transport property. Alternatively, an electric charge transport layer may be provided between the photoconductive layer for recording and the photoconductive layer for readout, as described in U.S. Pat. No. 6,268,614. Further, a crystallization prevention film, a blocking layer or the like may be provided between the photoconductive layer for recording and the first electrode layer.

In the radiation image detection method and the radiation image detection system according to the present invention, the up-conversion phosphor layer is irradiated with infrared light from the second electrode layer side. Then, fluorescence is emitted from the up-conversion phosphor layer by irradiation with the infrared light. Remaining electric charge which is present in the vicinity of the first electrode layer is excited by the fluorescence and erased. Therefore, it is sufficient only if the up-conversion phosphor layer is provided on the first electrode layer side. Hence, it is possible to improve the image quality of a readout radiation image using a compact radiation image detector by erasing remaining electric charge in the vicinity of the first electrode layer.

If the wavelength of the fluorescence is within a range of 400 nm to 800 nm, it is possible to use a conventional transparent electrode as the first electrode layer. Therefore, it is possible to produce a radiation image detector at a low cost. Further, it is possible to efficiently erase the remaining electric charge.

If one of $YF_3$:Yb+Er, $YF_3$:Yb+Tm and BaFCL:Yb+Er is used as an activator in the up-conversion phosphor layer, the up-conversion phosphor layer can efficiently convert infrared light into fluorescence.

If the up-conversion phosphor layer is a layer in which phosphor particles with diameters less than or equal to 150 μm are evenly dispersed, fluorescence is evenly emitted from the up-conversion phosphor layer. Therefore, it is possible to evenly erase the remaining electric charge.

DESCRIPTION OF THE PREFERRED EMBODIMENTS

Figure 1:
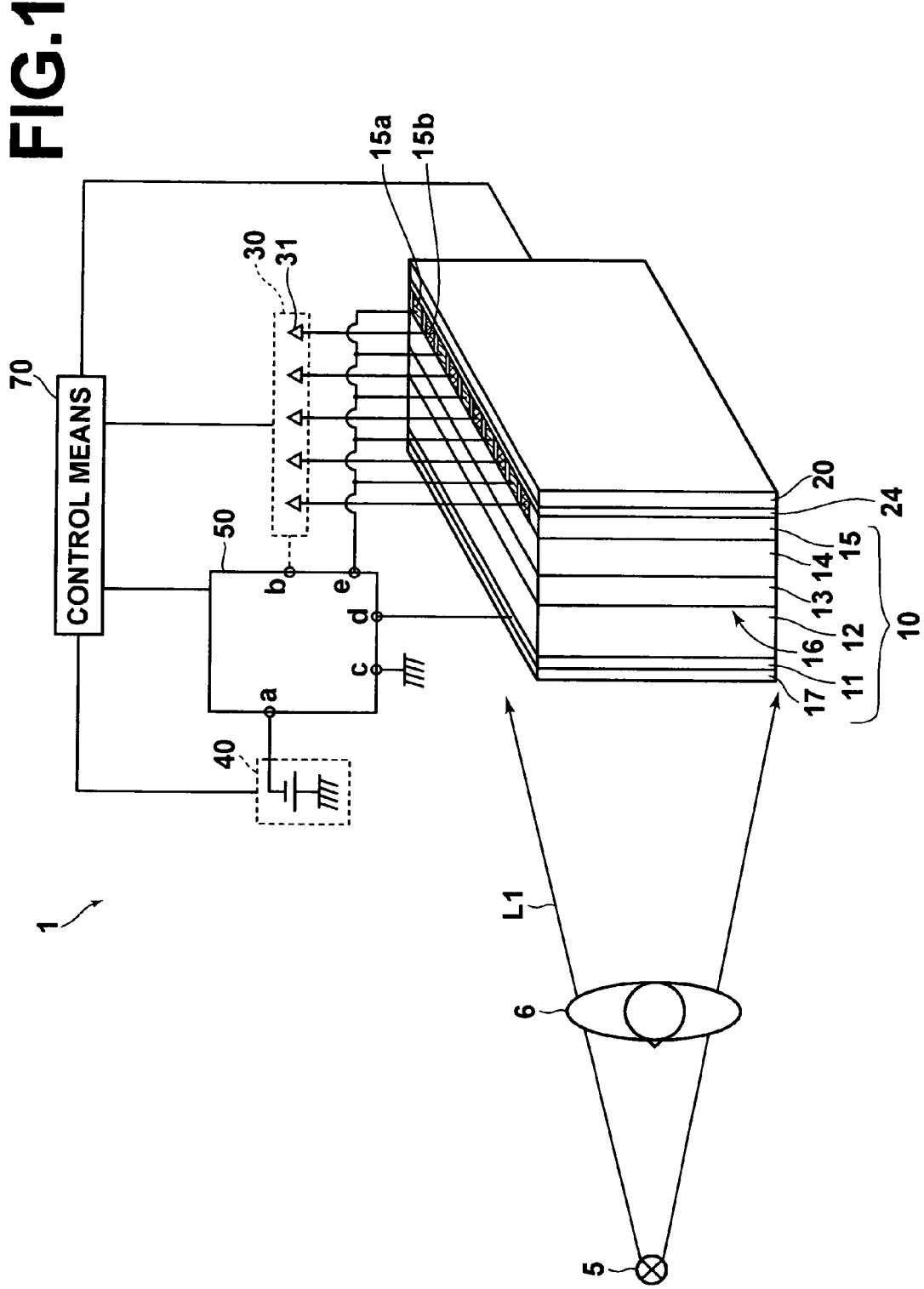
FIG. 1 is a schematic diagram illustrating the configuration of a radiation image recording/readout apparatus in an embodiment of the present invention.

Hereinafter, embodiments of a radiation image detection method and a radiation image detection system according to the present invention will be described with reference to attached drawings. FIG. 1 is a schematic diagram illustrating the configuration of a radiation image recording/readout apparatus 1, which is an embodiment of the present invention.

A radiation image recording/readout apparatus 1 according to the present invention includes a radiation source 5, a radiation image detector 10, a plane-shaped light source 20, an electric current detection unit 30, a voltage source 40, a switch means 50 and a control means 70, as illustrated in FIG. 1. The radiation source 5 emits radiation L1. The radiation image detector 10 detects a radiation image of a subject 6 by irradiation with the radiation L1 which has been emitted from the radiation source 5 and transmitted through the subject 6. The plane-shaped light source 20 emits blue light L2 and infrared light L3 to the radiation image detector 10. The blue light L2 is readout light for reading out a radiation image recorded in the radiation image detector 10. The blue light L2 also functions as erasing light for erasing remaining electric charge. The infrared light L3 is excitation light for an up-conversion phosphor layer 17, which will be described later. In the electric current detection unit 30, a multiplicity of electric current detection circuits 31 for detecting electric current generated in the radiation image detector 10 by irradiation with the readout light is provided. The voltage source 40 applies voltage to the radiation image detector 10 when the radiation image is recorded and when the remaining electric charge is erased. The switch means 50 switches a terminal to which a first electrode layer 11 of the radiation image detector 10 is connected. The switch means 50 also switches a terminal to which a second electrode layer 15 of the radiation image detector 10 is connected. The first electrode layer 11 and the second electrode layer 12 will be described later. The control means 70 is connected to the radiation source 5, the plane-shaped light source 20, the electric current detection unit 30, the voltage source 40 and the switch means 50. The control means 70 controls the operation of each of these elements.

Further, an insulating layer 24 is provided between the second electrode layer 15 and the plane-shaped light source 20.

The radiation image detector 10 includes an up-conversion phosphor layer 17, a first electrode layer 11, a photoconductive layer 12 for recording, an electric charge transport layer (a charge transport layer) 13, a photoconductive layer 14 for readout and a second electrode layer 15, which are superposed one on another in this order. The up-conversion phosphor layer 17 emits fluorescence L4 by irradiation with the infrared light L3. The first electrode layer 11 transmits the fluorescence L4 and the radiation L1 which carries a radiation image of the subject 6. The photoconductive layer 12 for recording generates electric charge by irradiation with the radiation transmitted through the first electrode layer 11. The electric charge transport layer 13 acts as an insulator against latent image charge generated in the photoconductive layer 12 for recording. The electric charge transport layer 13 also acts as a conductor of transport electric charge, of which the polarity is opposite to that of the latent image charge. The photoconductive layer 14 for readout generates electric charge by irradiation with the blue light L2 (readout light). The second electrode layer 15 transmits the blue light L2 (readout light). Here, the first electrode layer 11, the photoconductive layer 12 for recording, the electric charge transport layer 13, the photoconductive layer 14 for readout and the second electrode layer 15 transmit the infrared light L3. Further, a charge storage portion 16 for storing the latent image charge generated in the photoconductive layer 12 for recording is provided between the photoconductive layer 12 for recording and the electric charge transport layer 13.

As the first electrode layer 11, any kind of layer which transmits the infrared light L3, the fluorescence L4 and the radiation L1 maybe used. For example, a so-called NESA coating ($SnO_2$), an ITO (Indium Tin Oxide) coating, an IDIXO (Idemitsu Indium X-metal Oxide, manufactured by Idemitsu Kosan Co., Ltd.) coating, which is an amorphous light-transmissive oxide coating, or the like which has a thickness within a range of 50 to 200 nm may be used.

In the second electrode layer 15, a multiplicity of supplementary linear electrodes 15a and a multiplicity of readout linear electrodes 15b are alternately arranged in parallel, as illustrated in FIG. 1. Each of the supplementary linear electrodes 15a linearly extends, and transmits the infrared light L3 and the blue light L2. Each of the readout linear electrodes 15b linearly extends and blocks the blue light L2. The readout linear electrode 15b is made of metal, such as Al and Cr, which blocks the blue light L2. Further, the supplementary linear electrode 15a may be made of a material similar to that of the first electrode layer 11. The material for the supplementary linear electrode 15a transmits the blue light L2. The readout linear electrode 15b may be formed of a material similar to that of the supplementary linear electrode 15a. After the readout linear electrode 15b is formed of the material similar to that of the supplementary linear electrode 15a, the readout linear electrode 15b may be coated with a metal, such as Al and Cr, so as to block the blue light L2.

Further, a charge amplifier 31 is connected to each of the readout linear electrodes 15b in the second electrode layer 15. The charge amplifier 31 detects electric charge which is read out by the readout linear electrode 15b.

The photoconductive layer 12 for recording should transmit the infrared light L3 and generate electric charge by irradiation with radiation. As the material for the photoconductive layer 12 for recording, a material containing a-Se as its main component is used. The a-Se is advantageous as the material because it has relatively high quantum efficiency for radiation, high dark resistance or the like. An appropriate thickness of the photoconductive layer 12 for recording is approximately 500 μm.

The electric charge transport layer 13 should transmit the infrared light L3. In the electric charge transport layer 13, it is preferable that a difference between the mobility of electric charge charged in the first electrode layer 11 and that of electric charge which has an opposite polarity to that of the electric charge charged in the first electrode layer 11 is as large as possible (for example, more than or equal to $10^2$, and preferably, more than or equal to $10^3$). Further, the material for the electric charge transport layer 13 should be a photoconductive material which generates electric charge by irradiation with the blue light L2. For example, an alloy which contains Se-Te, Se-Te-As, Se-Te-P, Se-As or the like as its main component, an organic compound, such as poly-N-vinylcarbazole(PVK), N,N'-diphenyl-N,N'-bis(3-methylphenyl)-[1,1'-biphenyl]-4,4'-diamine (TPD) or a discotic liquid crystal, or a semiconductor, such as a dispersion of TPD in polymer (polycarbonate, polystyrene or PVK) or a-Se doped with 10 to 200 ppm of Cl, is appropriate as a material for the electric charge transport layer 13.

As a material for the photoconductive layer 14 for readout, a material which transmits the infrared light L3, and which exhibits conductivity by irradiation with readout light should be used. For example, a photoconductive material which contains one of a-Se, Se-Te, Se-As-Te, metal-free phthalocyanine, metal phthalocyanine, MgPc (Magnesium phthalocyanine), VoPc (phase II of Vanadyl phthalocyanine) and CuPc (Copper phthalocyanine) as its major component or components is preferable as the material for the photoconductive layer 14 for readout. Further, an appropriate thickness of the photoconductive layer 14 for readout is approximately 10 μm.

The up-conversion phosphor layer 17 is a glass layer, in which up-conversion phosphor particles are evenly dispersed. The diameter of an up-conversion phosphor particle should be less than or equal to 150 μm, and it is preferable that the diameter is less than or equal to 50 μm. When a plurality of photons acts on a single active ion, the single active ion is excited to a higher level. When the single active ion is excited to the higher level, up-conversion fluorescence occurs. The up-conversion fluorescence is different from ordinary fluorescence, and fluorescence, of which the wavelength is shorter than that of the excitation light, is emitted in the up-conversion fluorescence. As the up-conversion phosphor, a rare earth up-conversion phosphor using $YF_3$:Yb+Er as an activator is used. Therefore, the up-conversion phosphor layer 17 emits fluorescence L4, of which the wavelength is within the bandwidth of wavelengths of green light, by irradiation with the infrared light L3.

It is not necessary that the rare earth up-conversion phosphor using $YF_3$:Yb+Er as an activator is used as the up-conversion phosphor. Alternatively, phosphor using $YF_3$:Yb+Tm or BaFCL:Yb+Er as the activator may be used, for example. The up-conversion phosphor may be other kinds of up-conversion phosphor which are described in "Upconversion-Pumped Luminescence Efficiency of Rare-Earth-Doped Hosts Sensitized with Trivalent Ytterbium", Ralph H. Page, et al., J. Opt. Soc. Am. B, Vol. 15, No. 3, pp. 996-1008, March 1998 or the like. The up-conversion phosphor may be YAG-LASS (manufactured by Sumita Optical Glass, Inc.).

Further, it is not necessary that the layers of the radiation image detector 10 are structured, as described above. The layers of the radiation image detector 10 may be structured in various manners. For example, a blocking layer or the like may be provided between the layers. Alternatively, the radiation image detector 10 may be a radiation image detector (please refer to "A New Photoconductor Imaging System for Digital Radiography", H. Monts and F. Beaumont, Medical Physics, Vol. 16, No. 1, pp. 105-109, 1989) which includes a first electrode layer, a photoconductive layer for recording and readout and a second electrode layer, and in which a charge storage portion is formed at the interface between the photoconductive layer and the second electrode layer. Alternatively, the radiation image detector may include an electric charge transport photoconductive layer for readout instead of the charge transport layer and the photoconductive layer for readout. Further, the radiation image detector may be a radiation image detector in which a crystallization prevention film or a blocking layer (an insulating film) is provided between the photoconductive layer for recording and the first electrode layer. Further, the material for each of the layers may be a material other than the material described above as far as the action of the material is similar to that of the material described above.

Figure 2:
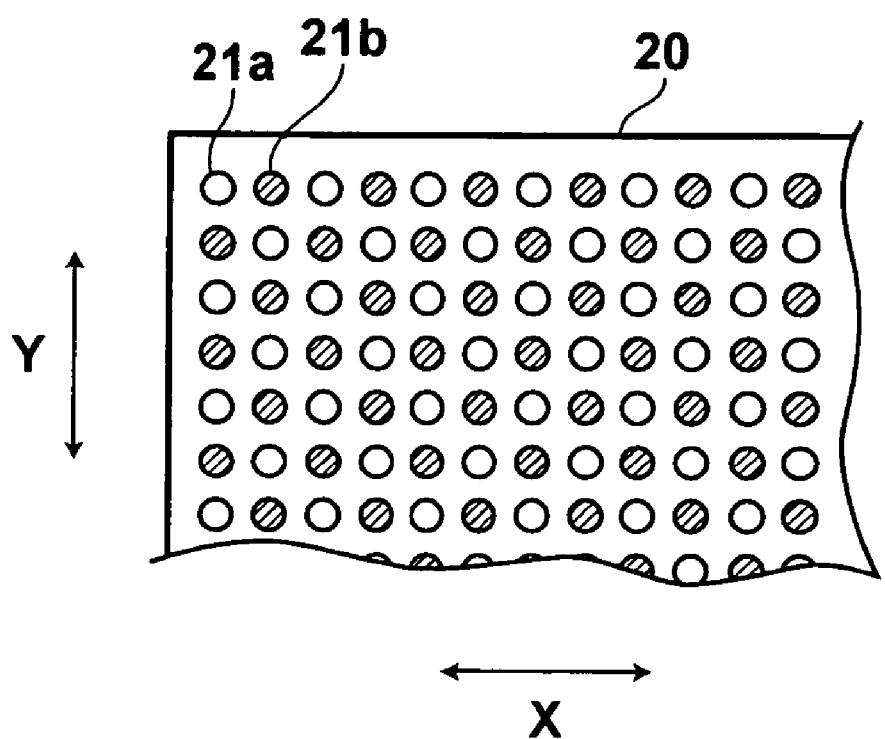
FIG. 2 is a schematic diagram illustrating the configuration of a plane-shaped light source.

Further, the radiation image detector 10, which is structured as described above, includes the plane-shaped light source 20 on the second electrode layer 15 side, as illustrated in FIG. 1. In the plane-shaped light source 20, a multiplicity of infrared LED's (light-emitting diodes) 21a and a multiplicity of blue LED's 21b are two-dimensionally arranged in X-Y directions, as illustrated in FIG. 2. The infrared LED 21a emits infrared light, and the blue LED 21b emits readout light and erasing light. In the plane-shaped light source 20, the infrared LED's 21a and the blue LED's 21b are alternately arranged with respect to the X direction and the Y direction so that the same kind of LED's are not adjacent to each other both in the X direction and in the Y direction. The plane-shaped light source 20, which is structured as described above, is provided on the second electrode layer side 15 of the radiation image detector 10. Each of the infrared LED's 21a and each of the blue LED's 21b in the plane-shaped light source 20 are connected to the control means 70, and the control means 70 controls emission from each of the infrared LED's 21a and emission from each of the blue LED's 21b. When an erasing operation, which will be described later, is performed, all of the infrared LED's 21a and the blue LED's 21b are controlled to emit light.

When a readout operation, which will be described later, is performed, the control means 70 controls emission so that rows of blue LED's 21b, which are arranged orthogonal to the readout linear electrode 15b in the second electrode layer 15 of the radiation image detector 10, sequentially emit light.

ON/OFF of voltage from the voltage source 40 and the magnitude of the voltage are controlled by the control means 70. Further, the electric current detection unit 30 includes a multiplicity of charge amplifiers 31 connected to respective readout linear electrodes 15b in the second electrode layer 15.

Further, a switch means 50 is a switch for changing connection of each of the readout linear electrode 15b, the supplementary linear electrode 15a and the first electrode layer 11. As illustrated in FIG. 1, an a-terminal of the switch means 50 is connected to a terminal on a negative side of the voltage source 40. A c-terminal of the switch means 50 is connected to an earth wire (a ground wire). Further, a d-terminal of the switch means 50 is connected to the first electrode layer 11 in the radiation image detector 10, and an e-terminal of the switch means 50 is connected to each of the supplementary linear electrodes 15a. A b-terminal is connected to each of the readout linear electrodes 15b only when a recording operation, which will be described later, is performed.

The switch means 50 is switched each time when the radiation image detector 10 performs an operation for erasing, recording and reading out a radiation image. The switching operation by the switch means 50 is controlled by the control means 70.

Figure 3A:
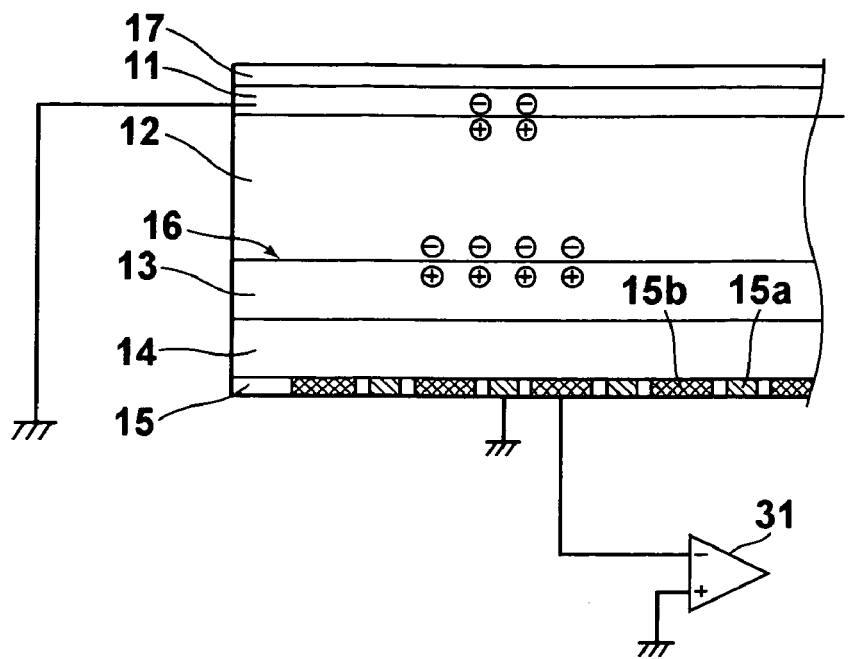
FIG. 3A is a schematic diagram for explaining an erasing operation in a radiation image detector of the radiation image recording/readout apparatus illustrated in FIG. 1.
Figure 3B:
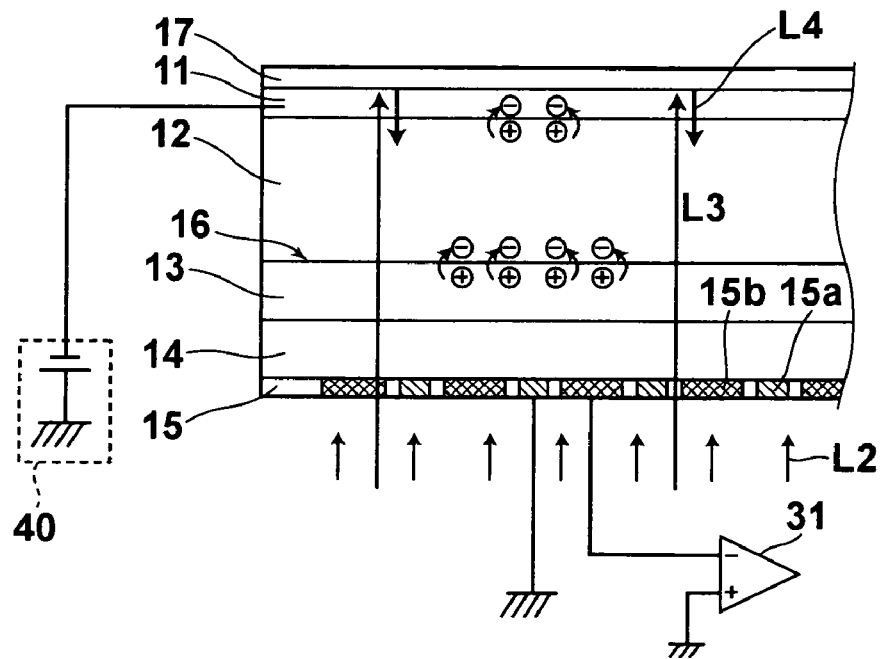
FIG. 3B is a schematic diagram for explaining an erasing operation in the radiation image detector of the radiation image recording/readout apparatus illustrated in FIG. 1.

Next, the operation of the radiation image recording/readout apparatus in the first embodiment of the present invention will be described. First, in the radiation image recording/readout apparatus 1 according to the present invention, an operation for erasing electric charge which remains in the radiation image detector 10 is performed before recording a new radiation image in the radiation image detector 10. The electric charge which remains in the radiation image detector 10 is electric charge which remains after a radiation image is read out from the radiation image detector 10. The action for erasing the remaining electric charge will be described in detail. FIGS. 3A and 3B are schematic diagrams for explaining the action for erasing the remaining electric charge in the radiation image detector 10.

When a radiation image is recorded, the radiation image detector 10 applies voltage for recording so that the first electrode layer 11 of the radiation image detector 10 has negative potential and so that the second electrode layer 15 of the radiation image detector 10 has positive potential, as will be described later. Further, the radiation image detector 10 is irradiated with radiation transmitted through the subject 6. Then, a pair of electric charges (dipole), namely a positive electric charge and a negative electric charge, is generated in the photoconductive layer 12 for recording in the radiation image detector 10. The positive electric charge in the pair of electric charges moves toward the first electrode layer 11, which is negatively charged. Then, the positive electric charge is combined with the negative charge in the first electrode layer 11, and disappears. Meanwhile, the negative electric charge in the pair of electric charges moves toward the second electrode layer 15, which is positively charged. However, since the electric charge transport layer 13 acts as a conductor of the positive electric charge and acts as an insulator against the negative electric charge. Therefore, the negative electric charge in the pair of electric charges is stored, as latent image charge, in the charge storage portion 16 at the interface between the photoconductive layer 12 for recording and the electric charge transport layer 13.

However, the movement of a part of positive electric charge which has been generated in the photoconductive layer 12 for recording, and which moves toward the first electrode layer 11, is blocked at the interface between the photoconductive layer 12 for recording and the first electrode layer 11. Accordingly, the positive electric charge remains at the interface between the photoconductive layer 12 for recording and the first electrode layer 11. Further, negative electric charge is trapped in the first electrode layer 11 so as to balance with the positive electric charge which remains at the interface. Such remaining electric charge is not erased in a readout operation, which will be described later. Particularly, when a crystallization prevention film, a blocking layer (insulating film) or the like is provided between the photoconductive layer 12 for recording and the first electrode layer 11, more electric charge remains.

Further, after the recorded radiation image is read out, negative electric charge which has not been read out remains in the charge storage portion 16. Further, positive electric charge is trapped in the electric charge transport layer 13 so as to balance with the negative electric charge which remains in the charge storage portion 16.

In the image recording/readout apparatus 1 according to the present invention, first, the a-terminal of the switch means 50 and the d-terminal of the switch means 50 are connected by the control means 70 so as to erase the remaining electric charge. Accordingly, the negative side of the voltage source 40 is connected to the first electrode layer 11. The control means 70 controls the voltage source 40, and voltage is applied from the voltage source 40 to the first electrode layer 11 so that the first electrode layer 11 has negative electric potential. It is preferable that the magnitude of the voltage applied to the first electrode layer 11 at this time is within a range of approximately $\frac{1}{10}$ to $\frac{1}{1000}$ of that of the voltage for recording which is applied between the first electrode layer 11 and the second electrode layer 15 during recording of a radiation image in the radiation image detector 10. It is more preferable that the magnitude of the voltage is approximately $\frac{1}{100}$ of that of the voltage for recording. In the present embodiment, the voltage for recording the radiation image is approximately 5 kV, and the voltage applied to erase the remaining electric charge is approximately 50V.

Further, the control means 70 controls the plane-shaped light source 20 so that all of the infrared LED's 21a and the blue LED's 21b emit light simultaneously. Accordingly, infrared light L3 and blue light L4 are emitted.

The infrared light L3 is transmitted through the second electrode layer 15, the photoconductive layer 14 for readout, the electric charge transport layer 13, the photoconductive layer 12 for recording and the first electrode layer 11. Then, the up-conversion phosphor layer 17 is irradiated with the infrared light L3. When the up-conversion phosphor layer 17 is irradiated with the infrared light L3, fluorescence L4, of which the wavelength is within the bandwidth of wavelengths of green light, is emitted from the up-conversion phosphor layer 17. The fluorescence L4 is transmitted through the first electrode layer 11, and the photoconductive layer 12 for recording is irradiated with the fluorescence L4. The positive remaining electric charge which remains on the side of the photoconductive layer 12 for recording and the negative electric charge which is trapped on the first electrode layer 11 side are excited and charge combination processes are accelerated. Accordingly, the remaining electric charge disappears.

Further, the radiation image detector 10 is irradiated with blue light L2 from the second electrode layer side 15 of the radiation image detector 10. When the radiation image detector 10 is irradiated with the blue light L2, the photoconductive layer 14 for readout exhibits conductivity. Therefore, the electric charge becomes easily movable. Hence, the negative electric charge, which remains in the charge storage portion 16, moves into the photoconductive layer 14 for readout and the negative electric charge is combined with the positive electric charge. Accordingly, the remaining electric charge is erased.

Further, voltage is applied from the voltage source 40 to the radiation image detector 10 so that the first electrode layer 11 has negative electric potential. Then, an electric field is generated by application of the voltage. Therefore, charge combination processes, in which the positive electric charge which remains on the side of the photoconductive layer 12 for recording and the negative electric charges trapped on the first electrode layer 11 side are combined with each other, are accelerated. Further, charge combination processes, in which the negative electric charge which remains in the charge storage portion 16 and the positive electric charges trapped on the side of the photoconductive layer 14 for readout are combined with each other, are accelerated. Hence, the remaining electric charge efficiently disappears.

Accordingly, both of the remaining electric charge in the vicinity of the first electrode layer 11 and the remaining charge in the vicinity of the charge storage portion 16 are erased through the action, as described above.

Figure 4A:
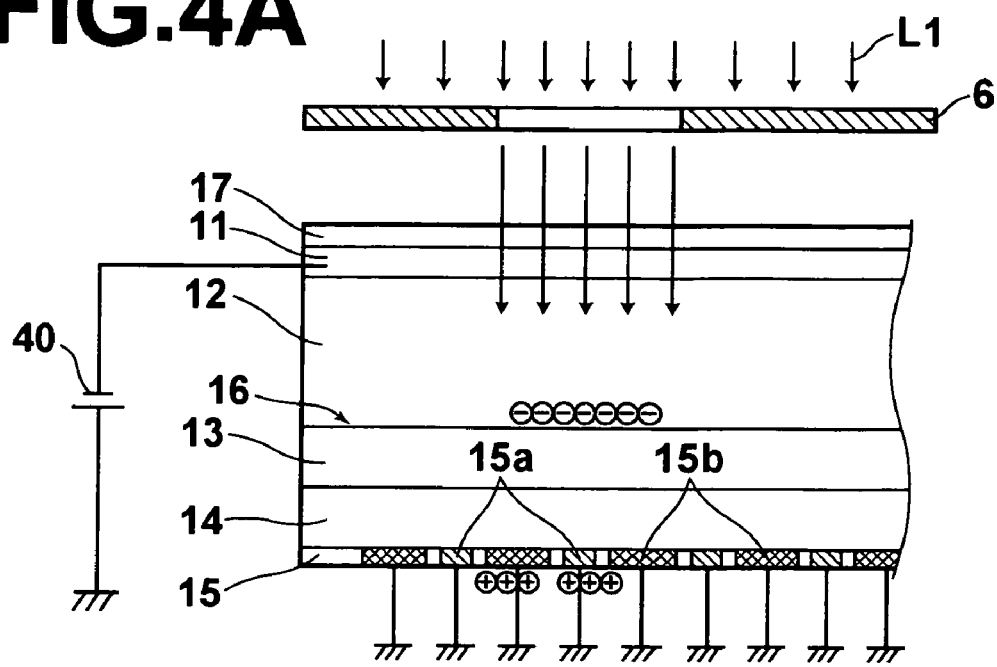
FIG. 4A is a schematic diagram for explaining recording and readout operations in the radiation image detector of the radiation image recording/readout apparatus illustrated in FIG. 1.
Figure 4B:
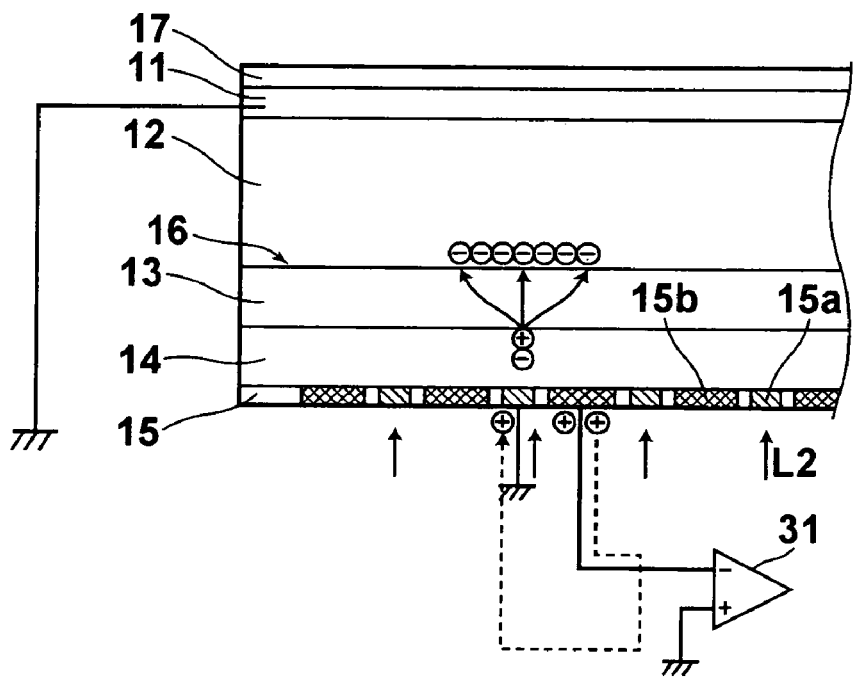
FIG. 4B is a schematic diagram for explaining recording and readout operations in the radiation image detector of the radiation image recording/readout apparatus illustrated in FIG. 1.

Next, an operation for recording a radiation image and an operation for reading out a radiation image by the radiation image recording/readout apparatus according to the above embodiment will be briefly described. FIGS. 4A and 4B are schematic diagrams for explaining the operation for recording a radiation image and the operation for reading out a radiation image by the radiation image detector 10. Here, a detailed description of the operation of the switch unit 50 will be omitted to simply the explanation.

In the operation for recording the radiation image, first, the control means 70 means applies voltage for recording between the first electrode layer 11 and the second electrode layer 15 in the radiation image detector 10, as illustrated in FIG. 4A. The magnitude of the voltage for recording which is applied at this time is approximately 5 kV. Further, the voltage for recording is applied so that the first electrode layer 11 has a negative electric potential and so that the second electrode layer 15 has a positive electric potential. After the voltage for recording is applied, radiation is emitted from the radiation source 5, and the radiation image detector 10 is irradiated with the radiation transmitted through the subject 6. Then, a pair of electric charges, namely a positive electric charge and a negative electric charge, is generated in the photoconductive layer 12 for recording in the radiation image detector 10. The positive electric charge in the pair of electric charges moves toward the first electrode layer 11, which is negatively charged. Then, the positive electric charge is combined with the negative electric charge in the first electrode layer 11, and disappears. Meanwhile, the negative electric charge in the pair of electric charges, which is generated as described above, moves toward the second electrode layer 15, which is positively charged. However, the electric charge transport layer 13 acts as a conductor of the positive electric charge, and acts as an insulator against the negative electric charge. Therefore, the negative electric charge is stored in the charge storage portion 16 at the interface between the photoconductive layer 12 for recording and the electric charge transport layer 13, as illustrated in FIG. 4B.

Next, the operation for reading out the radiation image, which is recorded as described above, will be described. As illustrated in FIG. 4B, the first electrode layer 11 and the supplementary linear electrodes 15a in the second electrode layer 15 are grounded. The readout linear electrodes 15b are connected to respective charge amplifiers 31. Then, the control means 70 controls the plane-shaped light source 20 so that rows of blue LED's 21b which are arranged orthogonal to the readout linear electrode 15b in the second electrode layer 15 of the radiation image detector 10 sequentially emit light.

When the radiation image detector 10 is irradiated with the blue light L2 by controlling the plane-shaped light source 20, as described above, the blue light L2 is transmitted through the supplementary electrodes 15a in the second electrode layer 15, and the photoconductive layer 14 for readout is irradiated with the blue light L2. Then, a pair of electric charges is generated in the photoconductive layer 14 for readout, as illustrated in FIG. 4B.

Then, the positive electric charge in the pair of electric charges is transmitted through the photoconductive layer 14 for readout. Then, the positive electric charge is combined with the negative electric charge in the charge storage portion 16, and disappears. Meanwhile, the negative electric charge in the pair of electric charges, which has been generated in the photoconductive layer 14 for readout, moves toward the positive electric charge charged in the second electrode layer 15. Then, the negative electric charge is combined with the positive electric charge charged in the supplementary linear electrode 15a in the second electrode layer 15. At the same time, the negative electric charge is combined with the positive electric charge charged in the readout linear electrode 15b through the charge amplifier 31. The charge amplifiers are sequentially switched at predetermined timing based on a scan operation performed using the blue light L2. Accordingly, an electric signal for each pixel of the radiation image is sequentially output from respective charge amplifiers 31.

As apparent from the above description, in the radiation image recording/readout apparatus 1, the up-conversion phosphor layer 17 is irradiated with the infrared light L3 from the second electrode layer 15 side. Accordingly, the fluorescence L4 is emitted from the up-conversion phosphor layer 17. Then, charge combination processes, in which the positive electric charge which remains in the vicinity of the first electrode layer 11 and the negative electric charge which is trapped on the first electrode layer 11 side are combined with each other, are accelerated, and the remaining electric charge in the vicinity of the first electrode layer 11 is erased. Therefore, it is sufficient only if a thin up-conversion phosphor layer is provided on the first electrode layer side. Hence, it is possible to erase the remaining electric charge which is present in the vicinity of the first electrode layer by the radiation image recording/readout apparatus 1, which has a compact structure. Further, it is possible to improve the image quality of the readout radiation image.

Since the wavelength of the fluorescence L4 is within the bandwidth of the wavelengths of green light, a conventional transparent electrode can be used as the first electrode layer 11. Therefore, it is able to produce a radiation image detector at a low cost. Further, it is possible to efficiently excite and erase the remaining electric charge in the vicinity of the first electrode layer 11.

If one of $YF_3$:Yb+Er, $YF_3$:Yb+Tm and BaFCL:Yb+Er is used as an activator in the up-conversion phosphor layer 17, it is possible to efficiently convert the infrared light L3 to the fluorescence L4.

If phosphor particles, of which the diameters are less than or equal to 150 µm, are evenly dispersed in the up-conversion phosphor layer 17, the fluorescence L4 is evenly emitted from the up-conversion phosphor layer 17. Therefore, it is possible to evenly erase the remaining electric charge. The resolution of a general radiation image detector is approximately 150 µm. However, in a radiation image detector for mammography, a resolution of approximately 50 µm is required. When the radiation image detector is used in mammography, it is preferable that the diameter of the phosphor particle is less than or equal to 50 µm. If the diameter of the phosphor particle is smaller, it is possible to improve the evenness of the fluorescence L4. Further, it is possible to evenly erase the remaining electric charge.

In the above embodiment, the light source for erasing and the readout light source are formed by the plane-shaped light source 20, in which the infrared LED's 21a and the blue LED's 21b are two-dimensionally arranged, as described above. However, it is not necessary that the light source for erasing and the readout light source are formed by the plane-shaped light source 20. Other kinds of light source, such as a line light source and a beam light source, may be used as long as the entire surface of the radiation image detector 10 can be irradiated. Further, the infrared light and the blue light may be separately emitted. Alternatively, the infrared light and the blue light may be emitted simultaneously.

What is claimed is:

1. A radiation image detection method using a radiation image detector, wherein the radiation image detector includes an up-conversion phosphor layer, a first electrode layer, a photoconductive layer for recording, a charge storage portion, a photoconductive layer for readout and a second electrode layer, and wherein the up-conversion phosphor layer emits fluorescence with a wavelength shorter than that of infrared light by irradiation with the infrared light, and wherein the first electrode layer transmits the infrared light, the fluorescence and radiation carrying a radiation image, and wherein the photoconductive layer for recording is a layer which transmits the infrared light, and which exhibits conductivity and generates electric charge corresponding to the dose of radiation by irradiation with the radiation transmitted through the first electrode layer, and wherein the charge storage portion stores electric charge generated in the photoconductive layer for recording, and wherein the photoconductive layer for readout is a layer which transmits the infrared light, and which exhibits conductivity by irradiation with readout light, and wherein the second electrode layer transmits the infrared light and the readout light, and wherein the radiation image detector records radiation as latent image charge in the charge storage portion, the method comprising the steps of:

reading out the electric charge stored in the charge storage portion by irradiating the photoconductive layer for readout with the readout light from the second electrode layer side of the radiation image detector;

irradiating the up-conversion phosphor layer with the infrared light from the second electrode layer side; and erasing remaining charge which is present in the vicinity of the first electrode layer by fluorescence emitted from the up-conversion phosphor layer by irradiation with the infrared light.

2. A radiation image detection method, as defined in claim 1, wherein the wavelength of the fluorescence is within a range of 400 nm to 800 nm.

3. A radiation image detection system comprising:
a radiation image detector;
a readout light irradiation means; and
an infrared light irradiation means, wherein the radiation image detector includes an up-conversion phosphor layer, a first electrode layer, a photoconductive layer for recording, a charge storage portion, a photoconductive layer for readout and a second electrode layer, and wherein the up-conversion phosphor layer emits fluorescence with a wavelength shorter than that of infrared light by irradiation with the infrared light, and wherein the first electrode layer transmits the infrared light, the fluorescence and radiation carrying a radiation image, and wherein the photoconductive layer for recording is a layer which transmits the infrared light, and which exhibits conductivity and generates electric charge corresponding to the dose of radiation by irradiation with the radiation transmitted through the first electrode layer, and wherein the charge storage portion stores electric charge generated in the photoconductive layer for recording, and wherein the photoconductive layer for readout is a layer which transmits the infrared light, and which exhibits conductivity by irradiation with readout light, and wherein the second electrode layer transmits the infrared light and the readout light, and wherein the radiation image detector records radiation as latent image charge in the charge storage portion, and wherein the readout light irradiation means irradiates the photoconductive layer for readout with the readout light from the second electrode layer side of the radiation image detector, and wherein the infrared light irradiation means irradiates the up-conversion phosphor layer with the infrared light from the second electrode side, and wherein remaining charge which is present in the vicinity of the first electrode layer is erased by fluorescence emitted from the up-conversion phosphor layer by irradiation with the infrared light.

4. A radiation image detection system, as defined in claim 3, wherein the wavelength of the fluorescence is within a range of 400 nm to 800 nm.

5. A radiation image detection system, as defined in claim 3, wherein one of $YF_3$:Yb+Er, $YF_3$:Yb+Tm and BaFCL:Yb+Er is used as an activator in the up-conversion phosphor layer.

6. A radiation image detection system, as defined in claim 4, wherein one of $YF_3$:Yb+Er, $YF_3$:Yb+Tm and BaFCL:Yb+Er is used as an activator in the up-conversion phosphor layer.

7. A radiation image detection system, as defined in claim 3, wherein phosphor particles with diameters less than or equal to 150 μm are evenly dispersed in the up-conversion phosphor layer.

8. A radiation image detection system, as defined in claim 4, wherein phosphor particles with diameters less than or equal to 150 μm are evenly dispersed in the up-conversion phosphor layer.

9. A radiation image detection system, as defined in claim 5, wherein phosphor particles with diameters less than or equal to 150 μm are evenly dispersed in the up-conversion phosphor layer.

10. A radiation image detection system, as defined in claim 6, wherein phosphor particles with diameters less than or equal to 150 μm are evenly dispersed in the up-conversion phosphor layer.

* * * * *